July 16, 1963    J. CRACKNELL ETAL    3,097,702
APPARATUS FOR THINNING GROWING SEEDLINGS, AND HOEING
BETWEEN PLANTS, GROWING IN ROWS
Filed June 2, 1961    2 Sheets-Sheet 1

INVENTORS
JOHN CRACKNELL
JOHN C CRACKNELL
DEREK N COOPER

July 16, 1963 J. CRACKNELL ETAL 3,097,702
APPARATUS FOR THINNING GROWING SEEDLINGS, AND HOEING
BETWEEN PLANTS, GROWING IN ROWS
Filed June 2, 1961 2 Sheets-Sheet 2
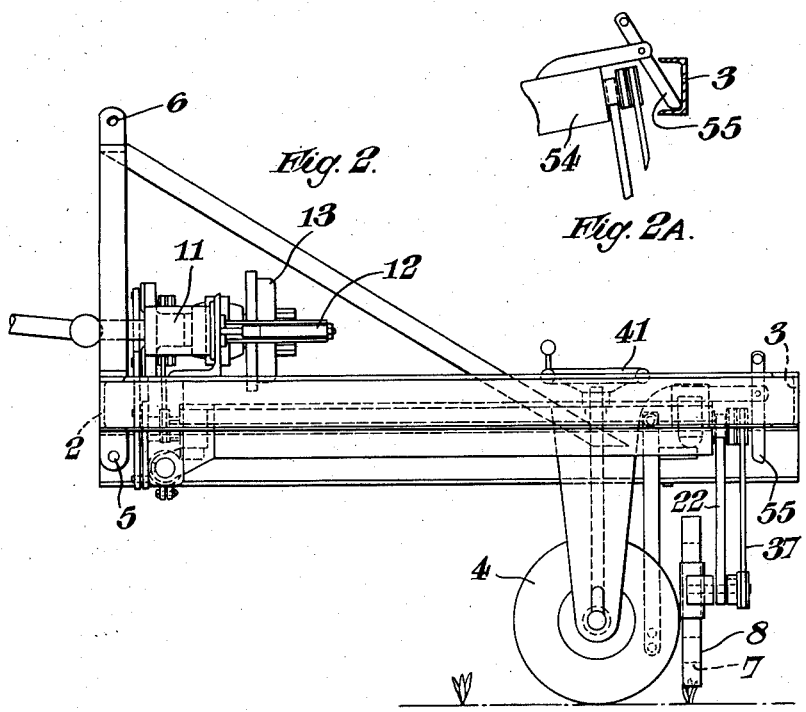
INVENTORS
JOHN CRACKNELL
JOHN C. CRACKNELL
DEREK N. COOPER
By

# United States Patent Office 3,097,702
Patented July 16, 1963

3,097,702
APPARATUS FOR THINNING GROWING SEEDLINGS, AND HOEING BETWEEN PLANTS, GROWING IN ROWS
John Cracknell and John Colin Cracknell, both of The Grove, Great Henny, near Sudbury, Suffolk, England, and Derek Norman Cooper, The Firs, New Queen's Road, Sudbury, Suffolk, England
Filed June 2, 1961, Ser. No. 114,480
Claims priority, application Great Britain June 3, 1960
4 Claims. (Cl. 172—6)

The present invention concerns an apparatus primarily intended for thinning seedlings growing in rows, such as sugar beets, wherein it is necessary to chop out seedlings at intervals to ensure sufficient spacing between those remaining, but it may also advantageously be used for hoeing between plants in a row to remove weeds.

The main object of the present invention is to provide an apparatus which will travel over the ground and which is adapted in a simple and convenient manner, to operate selectively, cutters or the like for chopping out seedlings. Another object is to provide such an apparatus which is simple to operate and can deal quickly with a field of seedlings. A further object is to provide an apparatus as above mentioned wherein an operator can select those seedlings in a row which are to remain and, by a simple co-ordinating operation in relation to the seedlings, chop out all other seedlings.

According to the present invention there is provided apparatus for thinning out or weeding between plants or seedlings growing in rows which comprises a chassis, means for supporting the chassis for movement over the ground, a plant cutting device supported by the chassis, actuating means associated with said cutting device for retracting it to an inoperative position and retaining it in this position for a predetermined time, and for then returning the device to an operative cutting position, means for coupling said actuating means to a source of power, a solenoid for actuating said coupling means, a switch for energizing the solenoid and a trip arm operable at will by an operator to close the switch, a hold-on switch operated by the first mentioned switch to retain the solenoid energized, and a rotary timing disc driven by said source of power for opening the hold-on switch when the cutting device returns to a ground penetrating position.

A particular advantage of the construction provided by this invention is that an operator seated on the apparatus can select at will the plants which are to remain in the ground by directing a pointer or stick at a plant to be left so that the lower end of the pointer penetrates the soil adjacent to said plant and by holding the pointer temporarily anchored in this position as the apparatus moves over the ground the trip arm engages the pointer with the result that the cutting device is automatically moved to inoperative positions and does not return to an operative position until the cutting device has moved past the wanted plant so that this plant remains untouched.

To enable the invention to be clearly understood, various embodiments thereof will now be described by way of example with reference to the accompanying drawings, wherein:

FIGURE 2 is a side view of FIGURE 1, with parts omitted for clarity,

FIGURE 2A is a fragmentary view illustrating a detail,

Figure 1:
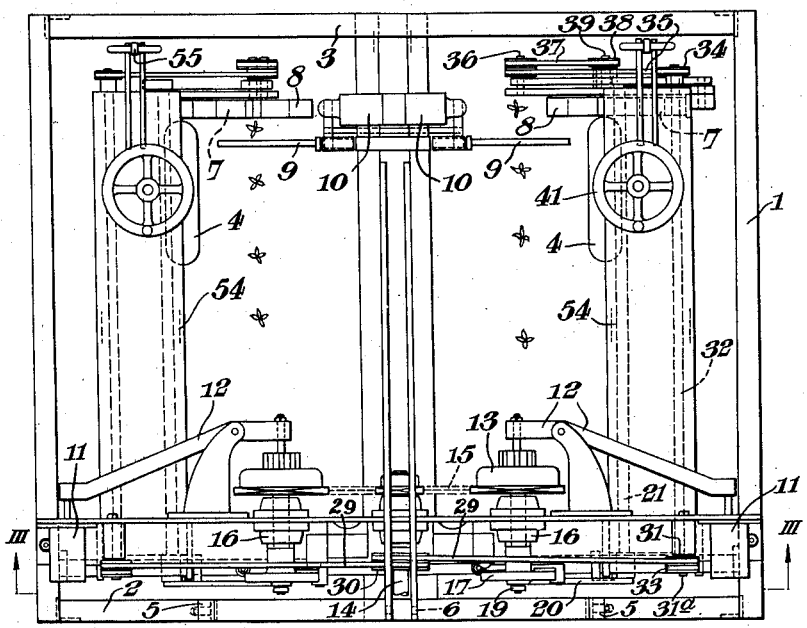
FIGURE 1 is a plan view of apparatus according to a first embodiment.

Referring to the drawings, the apparatus comprises a chassis having side frame members 1 and front and back members 2 and 3, respectively, mounted on a pair of ground-engaging wheels 4 or the equivalent, for example a sledge, or caterpillar tracks. The apparatus may be towed, self-propelled or, as shown by the drawings, provided at the front with attachment points 5 and 6 for connection to the usual three point linkage of a tractor.

Figure 3:
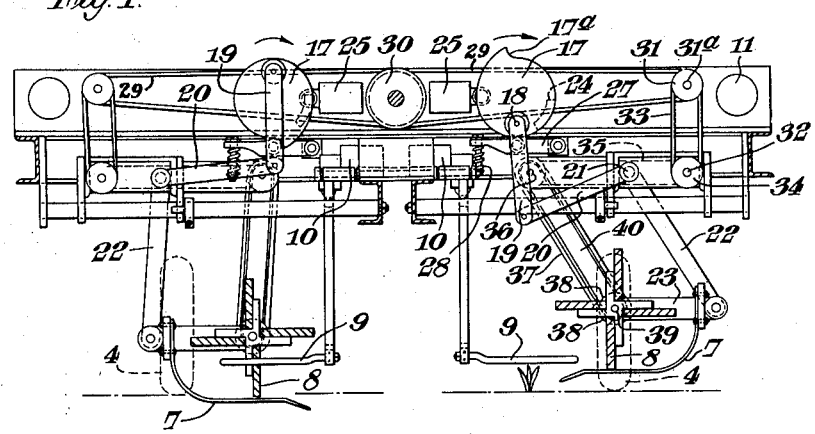
FIGURE 3 is a front view taken on the line III—III of FIGURE 1, with parts omitted for clarity.

The apparatus is provided at the rear of the chassis with a seat or seats (omitted for clarity) for two operators and at each side of the machine there is provided a cutting device consisting of a blade 7 adapted, in a manner about to be described, to be swung laterally upwardly and outwardly of the machine from an operative position as shown at the left hand side of FIGURE 3, to an inoperative position as shown at the right hand side of this figure in which the removal of seedlings is interrupted and a selected seedling allowed to remain in the ground. Each cutting blade 7 may be of any desired form but is preferably of L shape as shown. Each cutter 7 has associated therewith a rotary flail 8 for removing the chopped out seedlings from the line of seedlings, and this flail is similarly moved, when a selected seedling is to remain, from an operative position indicated at the left hand side of FIGURE 3 to an inoperative position shown at the right hand side of FIGURE 3 simultaneously with the movement of the associated cutter 7. Alternatively, a combined rotary cutter and flail, likeable to a vaned impeller may be provided.

The means for moving each cutter 7 and its associated flail 8 into an operative position comprises a trip arm 9 which is displaceable to operate a trip switch 10. A trip mechanism is provided which is operated by the movement of a trip arm 9. Each trip arm 9 itself is moved by a pointer (not shown) which can be supported by the machine or held by the operator, but in all cases is directly under the operator's control. Preferably, in use, the pointer is placed by the operator adjacent a seedling to be left. The apparatus is then arranged so that the pointer contacts the arm 9 which effects operation of means serving to retract or otherwise stop the cutting operation to leave the said seedling, returning to cut again after a sufficient pause. It will be appreciated that the switch arm 9 advances towards the pointer and is actuated thereby when it contacts it.

When the trip switch 10 is actuated, a circuit is closed to a solenoid 11 at the front of the machine to swing a clutch actuating link 12 to engage a clutch 13 to connect a drive from the tractor power take-off 14 by way of a chain drive 15 to a shaft 16 to which is fitted a timing or cranking disc 17.

The cranking disc 17 has pivoted thereto at 18 a link 19 which is displaceable vertically as the disc 17 rotates. The lower end of the link 19 has pivoted thereto an approximately horizontally disposed link 20 which is fixedly secured to the forward end of a shaft 21 which extends longitudinally of the machine from the front to the back thereof. The rear end of this shaft 21 has fixed thereto the upper end of a downwardly directed link 22 to the lower end of which is connected a bracket 23 upon which the cutter 7 and its associated flail 8 are mounted. The arrangement is such that the shaft 21 is first turned in one direction to effect swinging of the cutter 7 upwards and outwards to an inoperative position and during continued rotation of the timing disc 17, the shaft 21 is turned in the opposite direction to lower the cutter and flail into an operative position. The timing disc 17 is fitted with a cam 24 which coacts with a hold-on switch 25 which retains the circuit to the solenoid 11 closed after the trip switch has been actuated. When the timing disc 17 has made one complete revolution and the cutter and flail have been raised and then lowered, the cam 24 opens the hold-on switch 25 and the solenoid 11 is de-energized and the clutch allowed to open to disengage the drive to the shaft 21. Movement of the disc 17 beyond a starting position at the end of a cycle of operations is prevented by forming the disc 17 with a nose 17a which coacts with a roller 26 carried by a pivoted link 27 loaded by a spring 28.

Each of the flails 8 is driven continuously through a system of pulleys and belts. The driving means comprises a belt 29 driven from a pulley 30 on the power take-off shaft 14 which drives a pulley 31 mounted on a shaft 31a fitted with a second pulley driving a belt 33 which drives a pulley mounted on the forward end of a shaft 32. The rear end of this shaft 32 is fitted with a pulley 34 driving a belt 35 which drives a pulley mounted on a shaft 36. This shaft 36 carries a second pulley which drives a belt 37 which in turn drives a pulley 38 mounted on a shaft 39 carrying the rotary flail 8. The latter is supported by the cutter bracket 23 which is swung by the link 22, and to provide for a properly controlled movement, the bracket 23 is fitted with a second link 40 which is fitted on the shaft 36 so that the two links 22 and 40 move in parallel link fashion.

As the driving means for the mechanism is taken from the power take-off shaft 14 of the tractor, it is therefore in sequence with the distance travelled by the tractor and machine. This would also apply if the machine were self propelled. The withdrawal and re-entry time of the cutter 7 is therefore governed by the speed of travel of the machine. If the speed of the machine is increased the withdrawal and re-entry of the cutter 7 is increased proportionally and therefore the amount of unhoed soil around the selected plant is constant. The amount of unhoed soil can be varied by adjusting the drive ratio to the operating mechanism.

The object of the cleaving flail 8 is to remove the hoed weeds and/or plants from the rows of plants to ensure they do not re-root and to leave a clean row of plants that are left in the rows.

In the case of vehicle-towed or self-propelled machines, suitable steering of the main wheels is provided to enable the operator to correct any misalignment between tractor and machine in relation to the rows of plants or, in the case of self-propelled machines, for general steering purposes. The machine is also made steerable as an added advantage to assist in turning on the headlands and other restricted places.

The depth of cut of the cutter 7 can be adjusted by a depth adjusting handwheel 41 which raises and lowers the cutter units 7 in relation to the ground bearing skid or wheel 4.

In the case of multi-row machines the distance between cutter units 7 can be varied to accommodate different row widths. This may be accomplished by having the units mounted on suitable transverse slide rails to enable the units to be moved nearer together or farther apart. The drives to the units, in the case of V or suitable belt drives, can be adjusted by an adjustable jockey pulley. The linkage 19 and 20 from the cranking disc 17 to the cutter withdrawal re-entry bracket 23 can be made adjustable in length to accommodate various widths between units.

Suitable guards made of sheet metal or other material may be provided around the flails 8 and cutters 7 for safety and to direct the removed seedlings or plants and dust away from the machine and operator.

It is to be appreciated that the machine is selective in that it can be operated to leave the seedlings that are required to be left and single out those seedlings and weeds that are not required. It can also be used to hoe between plants or seedlings in rows and hoe right up to and around the growing plant.

We claim:

1. Apparatus for thinning out or weeding between plants or seedlings growing in rows comprising a chassis, means for supporting the chassis for movement over the ground, a plant cutting device, actuating means for retracting said cutting device to an inoperative position and retaining it in this position for a predetermined time, and for then returning the device to an operative cutting position, said actuating means comprising a swingable link supporting the cutting device and an oscillatable shaft supported by the chassis and to which one end of said link is fixed, means for coupling said shaft to a source of power, a solenoid for actuating said coupling means, a switch for energizing the solenoid and a trip arm operable at will by an operator to close the switch, a hold-on switch for retaining the solenoid energized, and a rotary timing disc driven by said source of power for opening the hold-on switch when the cutting device returns to a ground penetrating position.

2. Apparatus for thinning out or weeding between plants or seedlings growing in rows comprising a chassis, means for supporting the chassis for movement over the ground, a plant cutting device, actuating means for swinging said cutting device upwardly and outwardly from a side of the apparatus into an inoperative position and for swinging the cutting device downwardly to return it to an operative cutting position, said actuating means comprising a swingable link supporting the cutting device and an oscillatable shaft supported by the chassis and to which one end of said link is fixed, a clutch for coupling said shaft to a source of power, a solenoid for actuating said clutch, a switch for energizing the solenoid and a trip arm operable at will by an operator to close the switch, a hold-on switch for retaining the solenoid energized and a rotary timing disc driven by said source of power for opening the hold-on switch when the cutting device returns to a ground penetrating position.

3. Apparatus for thinning out or weeding between plants or seedlings growing in rows comprising a chassis, means for supporting the chassis for movement over the ground, a plant cutting device, actuating means for swinging said cutting device upwardly and outwardly from a side of the apparatus into an inoperative position, and for swinging the cutting device downwardly to return it to an operative cutting position, said actuating means comprising a swingable link supporting the cutting device and an oscillatable shaft supported by the chassis and to which one end of said link is fixed, a clutch for coupling said shaft to a source of power, a solenoid for actuating linkage for operating said clutch, a switch for energizing the solenoid and a trip arm operable at will by an operator to close the switch, a hold-on switch for retaining the solenoid energized, a rotary timing disc driven by said source of power for opening the hold-on switch when the cutting device returns to a ground penetrating position, and a linkage actuated by said rotary timing disc for oscillating said shaft.

4. Apparatus for thinning out or weeding between plants or seedlings growing in rows, comprising a chassis, means for supporting the chassis for movement over the ground, a pair of plant cutting devices supported respectively one at each side of the chassis, actuating means for each of said cutting devices for swinging it upwardly and outwardly from a side of the apparatus into an inoperative position and for swinging the cutting device downwardly to return it to an operative cutting position, said actuating means for each cutting device comprising a swingable link supporting the cutting device and an oscillatable shaft supported by the chassis and to which one end of said link is fixed, a rotary flail associated with each cutting device for displacing the cut plants laterally away from the row of plants, a clutch for coupling the actuating shaft of each cutting device to a power take-off connection on the chassis, a solenoid for actuating linkage for operating each clutch, a switch for energizing the solenoids and a trip arm operable to close the switch, hold-on switches for retaining the solenoids energized, rotary timing discs driven by said power take-off connection for opening the hold-on switches and de-energizing the solenoids when the cutting devices return to a ground penetrating position, and a linkage actuated by each of said rotary timing discs for oscillating the shaft of one of the cutting devices.

References Cited in the file of this patent

UNITED STATES PATENTS

| | | |
|---|---|---|
| 2,177,803 | Ferte et al. | Oct. 31, 1939 |
| 2,544,036 | McCann | Mar. 6, 1951 |
| 2,682,132 | Marihart | June 29, 1954 |
| 2,864,292 | Elliott et al. | Dec. 16, 1958 |